US010482658B2

(12) United States Patent
Shuster et al.

(10) Patent No.: US 10,482,658 B2
(45) Date of Patent: Nov. 19, 2019

(54) VISUALIZATION AND CONTROL OF REMOTE OBJECTS (71) Applicants: Gary Stephen Shuster, Fresno, CA (US); Charles Marion Curry, Fresno, CA (US)

(72) Inventors: Gary Stephen Shuster, Fresno, CA (US); Charles Marion Curry, Fresno, CA (US)

(*) Notice: Subject to any disclaimer, the term of this patent is extended or adjusted under 35 U.S.C. 154(b) by 1105 days.

(21) Appl. No.: 14/675,488

(22) Filed: Mar. 31, 2015

(65) Prior Publication Data
US 2015/0278689 A1 Oct. 1, 2015

Related U.S. Application Data (60) Provisional application No. 61/973,099, filed on Mar. 31, 2014.

(51) Int. Cl.
G06T 19/00 (2011.01)
G06F 3/01 (2006.01)

(52) U.S. Cl.
CPC ............ *G06T 19/006* (2013.01); *G06F 3/011* (2013.01)

(58) Field of Classification Search
CPC .............................. G06T 19/006; G06F 3/011
See application file for complete search history.

(56) References Cited

U.S. PATENT DOCUMENTS

| | | | | |
|---|---|---|---|---|
| 3,720,948 A * | 3/1973 | Eichen | ........... | G06F 3/033 235/61 PE |
| 5,266,875 A * | 11/1993 | Slotine | ........... | B25J 9/1689 318/568.1 |
| 5,400,264 A * | 3/1995 | Phillis | ........... | G01S 13/726 700/90 |
| 5,917,733 A * | 6/1999 | Bangham | ........... | H03H 17/0263 382/218 |
| 7,265,854 B1 * | 9/2007 | Hohensee | ........... | G06F 9/465 358/1.15 |
| 7,643,064 B1 * | 1/2010 | Jouppi | ........... | H04N 5/232 348/211.9 |
| 7,683,929 B2 * | 3/2010 | Elazar | ........... | G01S 3/7864 348/169 |

(Continued)

FOREIGN PATENT DOCUMENTS

WO WO 2008124041 A3 * 12/2008 ........ H04W 52/0229

*Primary Examiner* — Alexey Shmatov
*Assistant Examiner* — Robert Bejcek, II
(74) *Attorney, Agent, or Firm* — Sherrie M Flynn; Coleman & Horowitt, LLP (57) ABSTRACT Systems, devices and methods for controlling remote devices by modification of visual data prior to presentation to a person in order to make the person's response effectively the same as if the person were responding to data transmitted, processed and acted on instantaneously are disclosed. The systems, devices and methods advantageously minimize or eliminate the risks caused by a human response to data that has been delayed in transmission, processing and presentation. In an embodiment, a person controlling a remote device using an augmented reality interface is able to control the device based on predicted positions of an object at the time action is taken, thereby advantageously compensating for delays in receiving data, acting on such data and transmitting instructions or a response to the remote device.

16 Claims, 5 Drawing Sheets

(56) References Cited

U.S. PATENT DOCUMENTS

| | | | | |
|---|---|---|---|---|
| 8,416,296 B2* | 4/2013 | Cobb | | G06K 9/00785 348/143 |
| 9,561,019 B2* | 2/2017 | Mihailescu | | A61B 5/064 |
| 2004/0215880 A1* | 10/2004 | Chilimbi | | G06F 12/0802 711/118 |
| 2005/0036036 A1* | 2/2005 | Stevenson | | G08B 13/19608 348/211.99 |
| 2007/0018966 A1* | 1/2007 | Blythe | | G06F 3/0425 345/173 |
| 2008/0170776 A1* | 7/2008 | Albertson | | G06F 21/35 382/154 |
| 2009/0051559 A1* | 2/2009 | Wu | | G01G 19/414 340/666 |
| 2009/0150136 A1* | 6/2009 | Yang | | G06F 17/5022 703/13 |
| 2009/0163776 A1* | 6/2009 | Inbar | | A61B 5/14542 600/301 |
| 2010/0106356 A1* | 4/2010 | Trepagnier | | G01S 17/023 701/25 |
| 2010/0166260 A1* | 7/2010 | Huang | | G06K 9/00771 382/103 |
| 2011/0063523 A1* | 3/2011 | Karaoguz | | G06F 3/0304 348/734 |
| 2011/0184713 A1* | 7/2011 | Yang | | G06F 17/5022 703/13 |
| 2012/0233000 A1* | 9/2012 | Fisher | | G06Q 30/02 705/14.71 |
| 2013/0051624 A1* | 2/2013 | Iwasaki | | G06K 9/00791 382/103 |
| 2013/0223686 A1* | 8/2013 | Shimizu | | G08G 1/166 382/103 |
| 2013/0237811 A1* | 9/2013 | Mihailescu | | A61B 5/064 600/424 |
| 2013/0293395 A1* | 11/2013 | Ohama | | G08G 1/16 340/904 |
| 2013/0303195 A1* | 11/2013 | Bahl | | H04W 4/029 455/456.3 |
| 2014/0067801 A1* | 3/2014 | Marvit | | G06F 17/30241 707/736 |
| 2014/0289717 A1* | 9/2014 | Chan | | G06F 9/54 717/147 |
| 2015/0278689 A1* | 10/2015 | Shuster | | G06T 19/006 706/56 |

* cited by examiner

VISUALIZATION AND CONTROL OF REMOTE OBJECTS

CROSS-REFERENCE TO RELATED APPLICATIONS

This application claims the benefit of U.S. Provisional Patent Application No. 61/973,099 filed Mar. 31, 2014. The text and contents of that provisional patent application are hereby incorporated into this application by reference as if fully set forth herein.

FIELD OF INVENTION

The subject disclosure generally relates to the field of augmented reality ("AR"). Specifically, embodiments of the present invention relate to systems, methods and devices for effectively controlling remote objects and/or devices by compensating for the delay in human perception and response time.

DISCUSSION OF THE BACKGROUND

For the purposes of this specification, the present invention will generally be described in relation to controlling drones by predicting the positions of objects based on delays in human perception and response time. However, the invention is not so limited and may be applied in a variety of other applications where effectively eliminating the delays in perception and response time may be beneficial including, but not limited to, online gaming, remote surgery, remote robotic devices, control or response to elements moving faster than anticipated by biologically calibrated flash-drag compensation, and other remote and/or rapidly moving situations and/or targets.

Human sensory processing is not instantaneous. There are significant delays between generation of data (e.g., photons bouncing off of an object), reception of the data (e.g., photons reaching the retina), transmission of the data via nerves, and processing of the data by the brain.

Looking at a specific example, the time between photons bouncing off of an object in Iraq, being received in a drone camera, being processed by the drone camera and computer system, and encryption of the data, represents hundreds or thousands of milliseconds of delay. Transmission to a geostationary satellite and retransmission from the satellite to a Nevada ground station takes approximately 250 milliseconds. Decryption, processing and presentation to a drone pilot at that ground station takes additional milliseconds. It would not be unusual for the delay between generation of data in Iraq and action by a Nevada-located pilot based on that data to add more than one second to the time between data generation and implementation of the instructions sent to the drone in response.

Looking at a biological example, delays in human data processing mean that a bird in flight is slightly forward of the position it was in at the time of generation of the data that underlies the human perception of the bird (the time at which the visual data was generated by light reflecting off of the bird). Evolution provides humans with a brain function known as the "flash-drag effect," whereby the mammalian brain alters the apparent position of perceived objects to match the position they will be in at the time the brain is presented with the data received in the retina. As a result, for example, a hunter will "see" a flying bird at a point forward of where the photons hitting the retina actually reveal the bird to be located. Without the flash-drag effect, human hunters would constantly be shooting at a prior position of a moving target.

The flash-drag effect is calibrated for the circumstances for which it evolved—namely, unaided observation of objects in the direct field of view. As a result, it is unable to compensate for the additional delays caused by processing of data generated at a distance and/or in a non-biological manner. Similarly, the compensation mechanisms evolved at a time when targets and threats moved at a far slower speed and in a different manner than modern targets and threats. For example, a speeding car travels faster than the 65 miles per hour of the fastest land animal, the cheetah. The benefits of the flash-drag effect were significant enough that the effect evolved and persisted. However, it is less efficacious in modern world, and there is a strong need for a technology that allows similar benefits to be enjoyed with regard to modern threats, modern targets, non-biologically generated data, and actions over a large distance.

As AR technology becomes more widely adopted as a mechanism for control of or interaction with remote devices (and in some applications, even with respect to control of local devices), compensation for delays in transmission and processing of data, together with mechanisms to address instances where the compensation turns out to be inaccurate or insufficient, will be of enormous value in improving the range and utility of AR interfaces.

Consequently, there is a strong need for systems, methods and devices that effectively control remote devices by compensating for the delay in human perception and response time. To this end, it should be noted that the above-described deficiencies are merely intended to provide an overview of some of the problems of conventional systems, and are not intended to be exhaustive. Other problems with the current state of the art and corresponding benefits of some of the various non-limiting embodiments may become further apparent upon review of the following description of the invention.

SUMMARY OF THE INVENTION

Embodiments of the present invention relate to systems, methods and devices for controlling remote devices. In embodiments of the present invention, signal processing is used to modify visual data prior to presentation to a person, and/or to modify the action taken based on the response of a person, in order to make the human response effectively the same as if the human were responding to data transmitted, processed, and acted on instantaneously. This technology negates the risks and impairments in human response caused by the delays in signal transmission, processing, and presentation.

The invention brings the benefits of the flash-drag effect to human perception of types of visual information where the flash-drag effect would be beneficial, but where the biological implementation of flash-drag is absent, insufficient, or miscalibrated. In one aspect, humans controlling remote devices using an augmented reality interface are able to control those devices based on the likely and/or predicted position of objects at the time action is taken, thereby compensating for delays in receiving the data, acting on the data, and receipt, by the remote object, of the instructions from the operator.

In one embodiment, the invention relates to a method of compensating for the delay in controlling a remote device, the method comprising (i) analyzing a data stream to identify a moving object, (ii) determining the likely trajectory and/or speed of the moving object, (iii) calculating an amount of time between generation and perception of the data stream by a human, (iv) predicting one or more positions of the moving object based on the amount of time and the trajectory and/or speed, and (v) displaying the object in the predicted position(s). In some embodiments, the method may further comprise calculating a probability that the moving object will be in the predicted position, and if the probability of two or more predicted positions is greater than a threshold probability, displaying the predicted positions to the same person or, alternatively, displaying each of the predicted positions to a different person.

The invention also relates to a system for compensating for the delay in controlling a remote device comprising a computing device operably coupled to the remote device, wherein the computing device is configured to determine a predicted position of a moving object based on an amount of time between generation of a data stream and perception of the data stream by a human, and the trajectory and/or speed of the moving object. In some embodiments, the predicted position is adjusted to compensate for encryption and decryption times of the data stream. The predicted position may also be further adjusted to compensate for processing time of the human, nerve signal to limb movement conversion time, and the transmission time of a control input, instruction or response from the human to the remote device(s).

The benefits and advantages of the present invention are plenary. Put simply, the benefits and advantages that led to mammalian evolution of the flash-drag effect, are imprecisely analogous to (but a crude approximation of a subset of) the benefits and advantages that the present invention brings to human interaction with visual data that is not of a type that triggers an accurate biological flash-drag effect. Further, embodiments of the present invention include corrective technology to verify that the predicted path of an object was in fact followed, and through other aspects described herein, the invention brings additional benefits over the biological flash-drag effect.

These and other advantages of the present invention will become readily apparent from the detailed description below.

BRIEF DESCRIPTION OF THE DRAWINGS

Various non-limiting embodiments are further described with reference to the accompanying drawings in which.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications, and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures or components are known in the art, novel, or obvious.

There are a variety of circumstances in which humans are expected to process and/or act on data that was generated a material number of milliseconds prior to the time at which the human receives the data and the brain processes it in a manner sufficient to permit action.

Without limiting the invention to these applications, it is useful to note that humans may experience a material delay between generation of visual data and processing of that data in a variety of circumstances that may include, among others, online gaming, control of drones, remote surgery, remote robotic devices, control and/or response to elements moving faster than anticipated by biologically calibrated flash-drag compensation, and other remote and/or rapidly moving situations and/or targets. In one aspect, the instant invention may utilize one or more approaches to compensate for this delay.

One aspect is to utilize digital signal analysis and processing to identify objects in a video stream, determine their most likely trajectory and speed (whether an instant trajectory and speed, a trajectory and speed as it is most likely to change during the relevant period, or a combination thereof), calculate the amount of time that it has taken between original generation of the data and the calculation, calculate the amount of time it is most likely to take between the calculation and the conversion of the data to a human brain's perception of the object represented by the data, and then modify the data so that the object is shown, in the data viewed by the human, to be in a position that it will most likely actually be in at the time of human perception (typically forward of its actual position at the time of observation).

Figure 1:
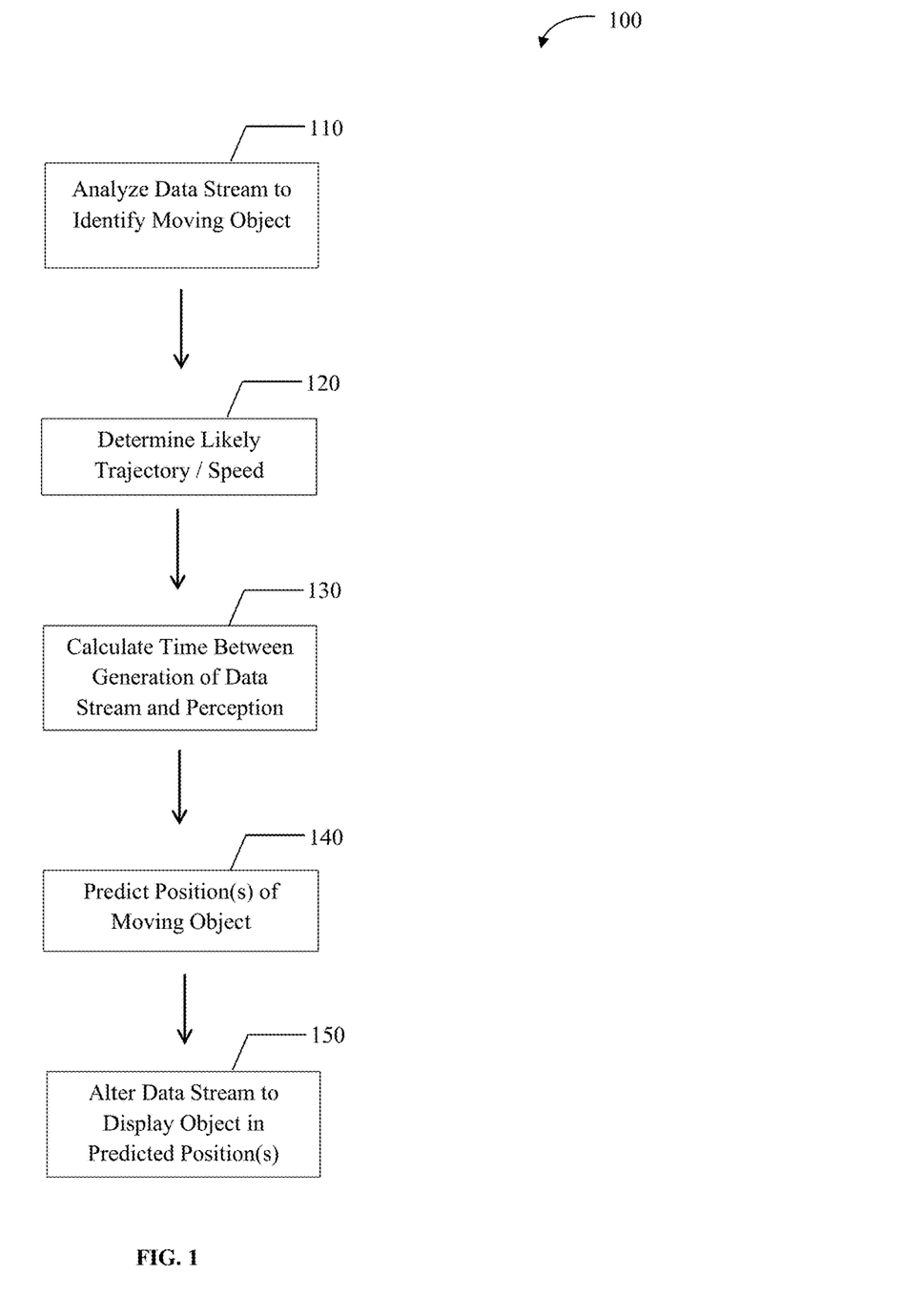
FIG. 1 schematically illustrates a method for predicting the position of a moving object, according to an embodiment of the present invention.

FIG. 1 schematically illustrates a method 100 that compensates for the delay in controlling a remote device utilizing digital signal analysis to display an object in a position the object will likely be in at the time of perception by a person. The method begins at step 110 wherein a digital data stream is analyzed to identify a moving object within the stream. The data stream may be analyzed by using digital signal analysis, object recognition algorithms and/or other data analysis and processing methods to identify such moving objects. At step 120, and based on such analysis, the speed and/or likely trajectory of the object is determined. At step 130, the time between the generation of the data stream and the perception of the object by a person is calculated.

Although in the embodiment of FIG. 1, the calculation at step 130 is shown to be a single step, the calculation may be performed in multiple steps. For example, an amount of time between the original generation of the data stream and when the calculation is performed may first be calculated, and then subsequently, a second calculation may be performed to determine an amount of time between the calculation and the conversion of the data to the person's perception of the object in the stream. Additionally, such calculations may be performed in any order.

At step 140, one or more predicted positions of the object in the data stream are determined based on the likely speed and trajectory of the object. In some embodiments, the prediction position(s) may be made based on the instantaneous speed and/or trajectory of the object, while in other embodiments, the predicted position(s) may be made based on the rate of change of the object's speed and/or trajectory. In yet other embodiments, a combination of instantaneous speed and/or trajectory and the rate of change of the speed and/or trajectory may be used to predict the position(s) of the object. At step 150, the data stream is altered and/or modified to display the object in the predicted positions(s). It should be noted that more than one position of the object may be likely because of the physical characteristics of the object and/or path on which the object is travelling (e.g., the object may be travelling on a road nearing an intersection, the object may be slowly, perhaps to reverse course, etc.).

In one aspect, the predicted position of an object may include compensation for the human biological flash-drag effect. In implementing such compensation, the object may be displayed to a human in a position where the flash-drag effect will then further change the perceived location of the object, and together with the original, digital alteration of object position, enable the human to perceive the object in its most likely actual position at the time the human perception takes place.

Where an analysis of the data stream indicates multiple likely positions at the time of human perception (for instance, where more than one position exceeds a threshold probability), the data may be digitally processed for viewing by more than one human operator, with each operator receiving data reflecting a different predicted position. Alternatively, the multiple predicted positions may be displayed to one person.

Many aspects of the invention are best disclosed and understood by discussion in the context of an exemplary use. In this document, control of a drone by a human operator is one of the primary settings for the example. However, it should be understood that applications of the invention may extend to many other uses.

Figure 2:
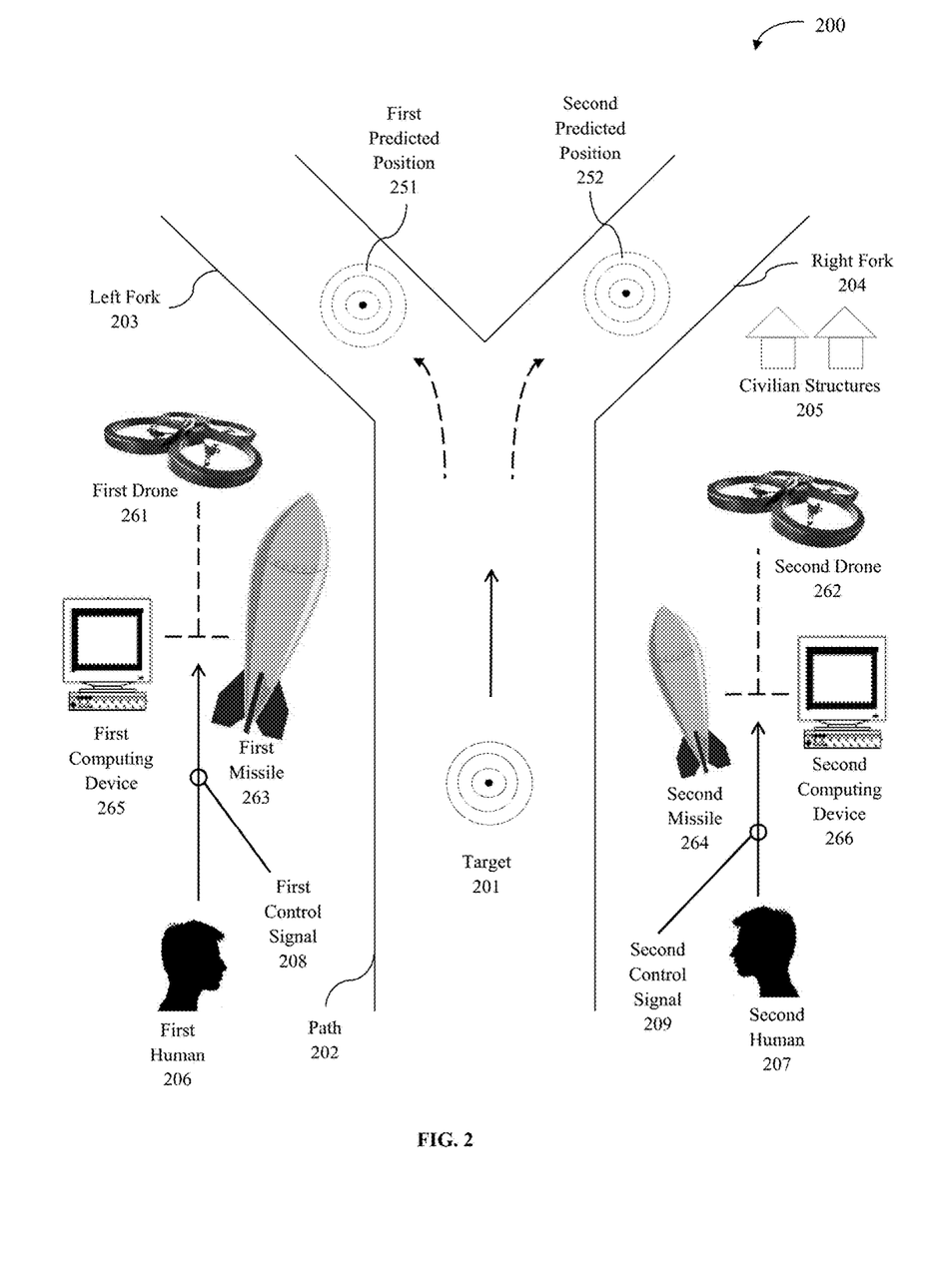
FIG. 2 schematically illustrates a system for controlling remote devices based on two predictions of the position of a target, according to an embodiment of the present invention.

Consider the simple example of a target running down a path as illustrated in FIG. 2. In the system 200 of FIG. 2, path 202 has a left fork 203 and a right fork 204. When the speed of the target is determined by analysis of the data stream, and the amount of time between the generation of the data stream and human perception is calculated, the target 201 may travel beyond the intersection of the left fork 203 and the right fork 204. Consequently, there may be two possible positions of the target 201 at the time of perception: first predicted position 251 and second predicted position 252. One human operator 206 may be shown the target 201 travelling down the left fork 203 to predicted position 251, and a second human operator 207 may be shown the target 201 travelling down the right fork 204 to predicted position 252.

Typically, after a human is presented with the altered data (the predicted position or positions are displayed), the human may send a control signal, instruction or a response to the altered data. Continuing with the example of the target 201 approaching a fork in the road, the first human operator 206 who received the first predicted position 251 (the "left" data) may instruct a first drone 261 to launch a first missile 263 (e.g., a full payload missile) to the first predicted position 251 (e.g., a position 100 yards forward on the left fork 203) by transmitting a first control signal 208, while the second human operator 207 who received the second predicted position 252 (the "right" data) may instruct a second drone 262 to launch a second missile 264 (e.g., a reduced payload/reduced "kill zone" missile because, for example, there are civilian structures 205 closer to the right fork 204 than to the left fork 203) to the second predicted position 252 (e.g., a position 100 yards forward on the right fork 204) by transmitting a second control signal 209.

In the embodiment of FIG. 2, a first computing device 265 may compare the first predicted position 251 to an actual position of the target (not shown), and a second computing device 266 may compare the second predicted position 252 to the actual position of the target. In some embodiments, the computing devices 265, 266 may be computers operably coupled to, respectively, the first and second drones 261, 262 (the devices receiving the instructions from the human operators). However, in other embodiments the computing devices 265, 266 may be another device or other person(s) receiving the instructions and comparing the actual position(s) of the target to the predicted position(s) that were transmitted to the humans 206, 207 sending the first and second control signals 207, 208.

In one aspect, where the data sent to a human operator (e.g., the human operator 206 or 207 in FIG. 2) includes a predicted position that matches the actual observed target position (in some instances, to within a predetermined and/or pre-specified tolerance), the instructions or control signal sent by that human (e.g., the control signal 208 or 209 in FIG. 2) are followed. The requisite tolerance may vary depending on the importance of taking some action, the costs of taking no action, or based on other criteria. In some aspects, if the predicted position does not match the actual observed target position within the predetermined/pre-specified tolerance, then the instruction, control signal or response sent by the human may be modified based on the actual position.

Figure 3:
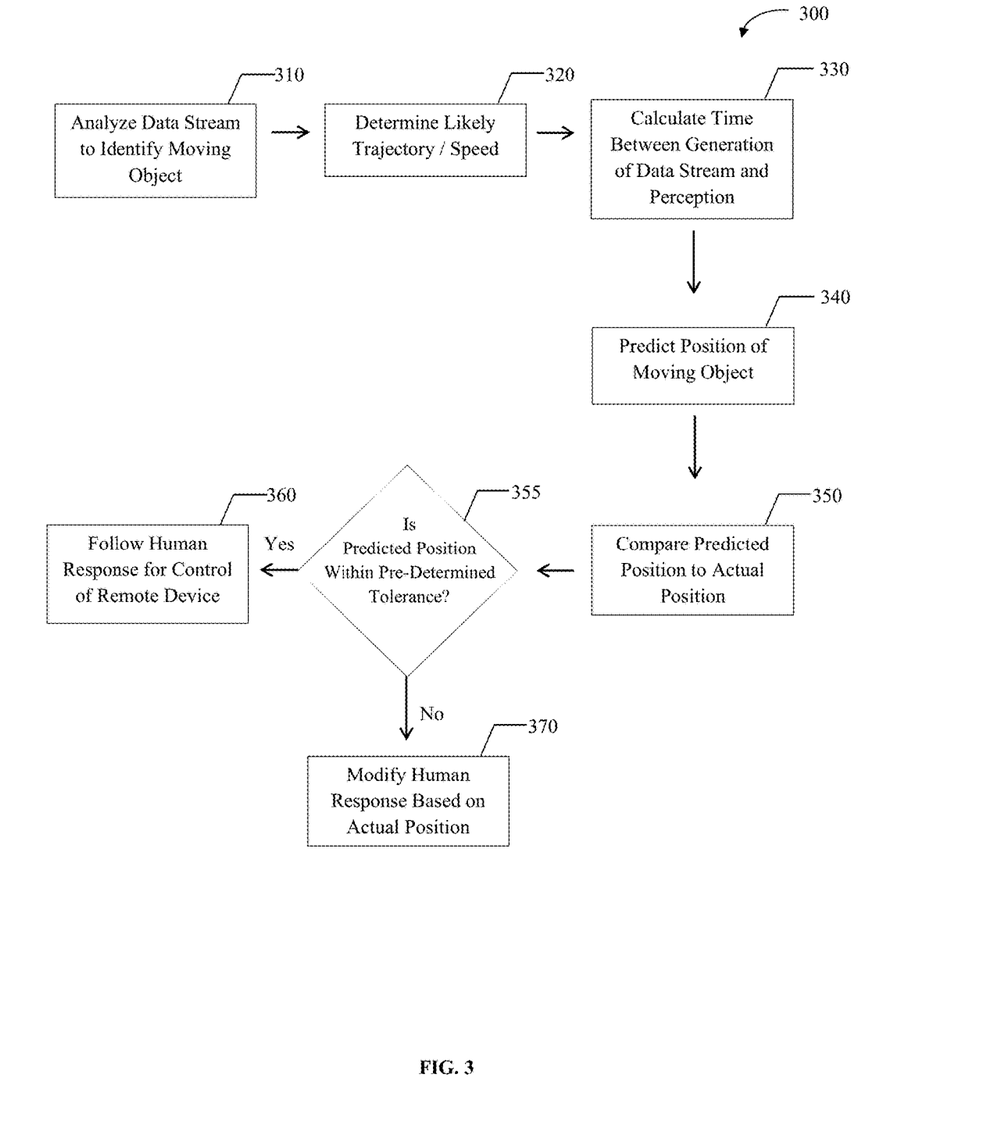
FIG. 3 schematically illustrates a method for control of remote devices based on a predetermined tolerance for the predicted position of an object, according to an embodiment of the present invention.

FIG. 3 schematically illustrates a method 300 wherein a human response is modified based on a comparison of the actual position to the predicted position of the object. The method begins in a similar manner to the method of FIG. 1. At step 310, a data stream is analyzed to identify a moving object. At step 320, the likely trajectory and/or speed of the object are determined, and at step 330, the time between generation of the data stream and human perception is calculated. At step 340, the predicted position of the moving object is determined based on the likely speed and/or trajectory of the object and the calculated time.

From step 350 on, the method 300 of FIG. 3 differs from the method 100 of FIG. 1, because at step 350, the predicted position of the object is compared to the actual position of the object. In some instances, the actual position of the object may be determined by computers operably coupled to the device receiving the control signal, instructions or response from the human operator, while in other instances, the computing device may be another device or other person receiving the instructions and comparing the actual position(s) of the target to the predicted position. At step 355, a determination is made as to whether the predicted position of the object is within a pre-determined tolerance of the actual position. The predetermined tolerance may be preset based on a percentage of the distance traveled by the object, a finite error rate, the speed at which the object is traveling, etc. The tolerance may also vary based on the type of object, the cost of the response, the potential damage caused by an inaccurate response, etc.

If the predicted position of the object when compared to the actual position is within the predetermined/pre-specified tolerance, at step 360, the control signal, instructions or response from the human operator for control of the remote device may be followed. If the predicted position of the object when compared to the actual position is not within the predetermined/pre-specified tolerance, at step 370, the human operator's control signal, instruction or response may be modified based on the actual position of the object. In some instances, the human operator's control signal, instruction or response may be aborted or rejected.

In one aspect, the predicted position of the target may also be adjusted to account for the time it will take for the instructions to get from the human to the device that the human is controlling or instructing. Returning to the example of the left/right forks (e.g., left and right forks 203, 204 of FIG. 2), if it takes 1,000 milliseconds for the signal to travel from the human operator (e.g., human 206, to the computer that encrypts it (e.g., computing device 265 of FIG. 2), from that computer to a satellite (not shown in the figures), from the satellite back to the drone (e.g., first drone 261 of FIG. 2), and to be decrypted by the drone, the predicted position of the target (e.g., target 201 in FIG. 2) may be displayed to the human operator based on an additional 1,000 milliseconds of trajectory and velocity.

To further illustrate the problem in the context of control of a drone, there is a delay of approximately 250 milliseconds second to go from Iraq to Nevada via geostationary satellite, and 250 milliseconds for the return trip. Added to this is time for encryption/decryption, processing time for the human, and time for a nerve signal to be converted to mechanical energy of a limb. Further, humans perceive items where they will be in around 250 milliseconds as a basic brain function (i.e., the flash-drag effect) and as a result, approximately 250 milliseconds may be subtracted from the predicted delay. The data coming from the drone would then be digitally manipulated to change target location and/or speed to compensate for these or other additional delays.

In one aspect, delays may be reduced by intercepting nerve signals (e.g., by using electrodes) at a point above the limb, or at least above the hand or foot, and converting the nerve signals into computer inputs in a manner crudely analogous to the difference between mechanical and fly-by-wire aircraft control.

It should be appreciated that it takes a substantial amount of time to convert a thought into mechanical movement of a finger or other appendage that moves or otherwise manipulates a control surface. A computer utilizing a Bayesian or other artificial intelligence or learning algorithm may determine signals that a particular operator sends indicating a likely muscle movement.

For example, an operator may experience a particular brainwave pattern 80% of the time prior to hitting "launch" on a drone missile. Similarly, an operator may experience an increase in electrical conduction by the skin, indicating an increase in sweating, 50% of the time when the operator is about to hit "abort" to call off or disable a missile. Indeed, any of the numerous "tells" that are observed by poker players, FBI agents and others who are trained to identify the significance of small signals may be correlated with certain actions by a particular operator.

In order to reduce delay that occurs in conversion of a thought to a fully actuated, muscle-driven control input, control signals may be sent to a remote device based on exceeding a confidence threshold in predicting an operator's response based on "tells". In one aspect, the instruction may simply be sent. In another, the instruction may be sent in a provisional manner, initiating the transmission, encryption, reception, decryption, and movement of the drone (or other remote device) in preparation for the predicted action. When the actual control input is made (or, in one aspect, when sufficient control input is made to exceed a threshold likelihood that the user is in fact making the predicted control input), a signal is sent confirming the prior instruction.

In another aspect, if the confidence threshold does not exceed the threshold level, then the instruction is sent provisionally and is confirmed when the actual response is received. In one aspect, the confirming signal may be sent in an expedited manner, for example, by bypassing the encryption. Whether sent in an expedited manner or not, upon receipt of the confirming signal, the remote device would already be positioned to act on the instructions more rapidly than if the provisional signal had not been sent.

In another aspect, if no confirming signal is sent and no rejecting signal is sent, the action may be completed, aborted, or acted upon based on whether the confidence level in the "tell" exceeds a set threshold. In another aspect, if the operator does not make the expected control input, an "abort" or "rejecting" signal may be sent in an analogous manner to the confirming signal, and the action aborted.

Figure 4:
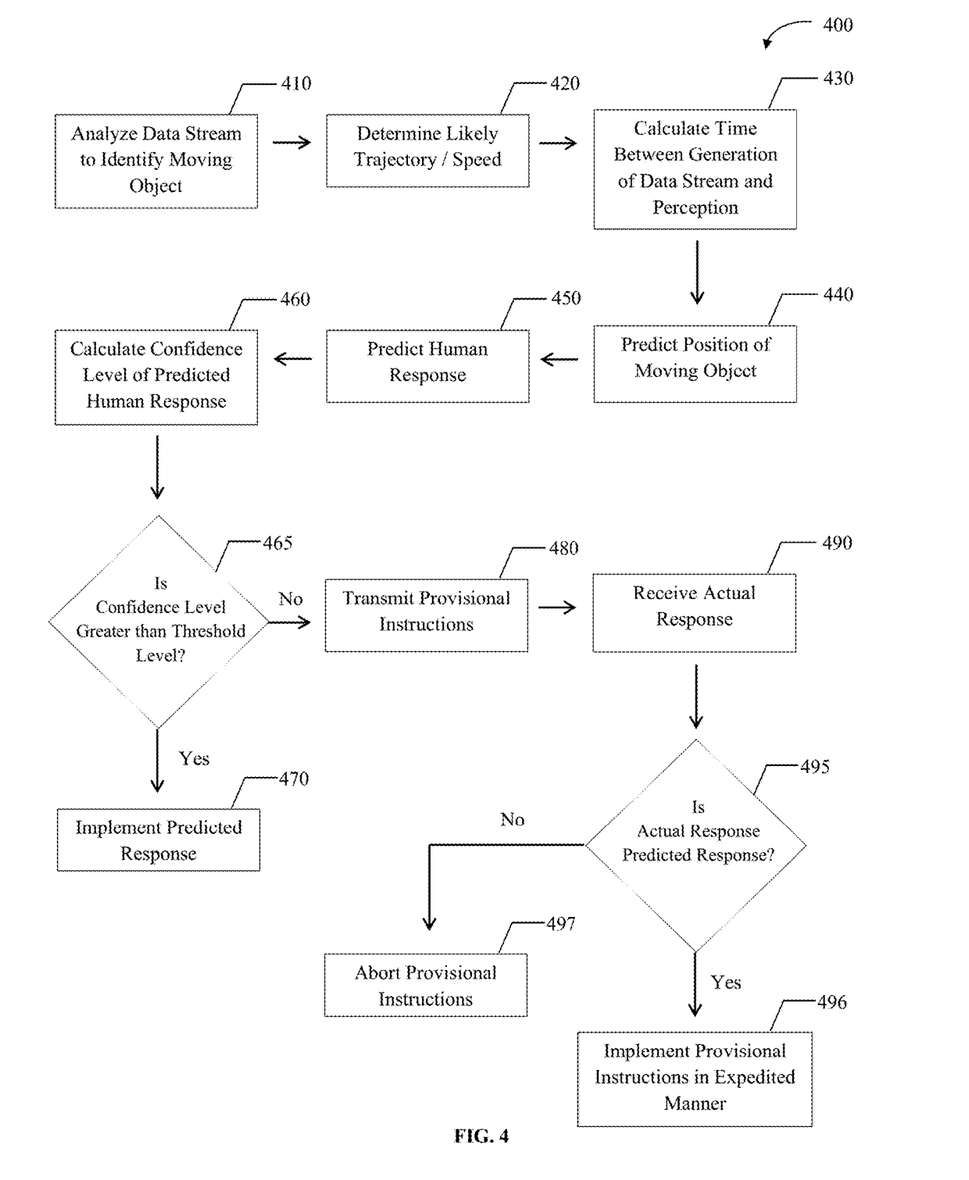
FIG. 4 schematically illustrates a method for control of remote objects by transmitting provisional instructions based on the predicted human response to the position of a moving object, according to an embodiment of the present invention.

Referring now to FIG. 4, an exemplary method 400 for reducing the delay that occurs in conversion of a thought to a control input is schematically shown. The steps 410 through 440 of method 400 are effectively the same steps 110 through 140 of method 100 of FIG. 1, and method 300 of FIG. 3. That is, at step 410, the data stream is analyzed to identify a moving object. At step 420, the likely trajectory and/or speed are determined. At step 430, the time between generation of the data stream and perception by the human operator are calculated, and at step 440, the predicted position of the moving object is determined.

At step 450 of method 400, the control input, instructions or response of the human operator is predicted based on the human operator's "tells" as described above. At step 460, the confidence level of the predicted control input, instructions or response is calculated. At step 465, the confidence level of the predicted control input, instructions or response from the human operator is compared to a predetermined confidence level. The requisite confidence level may vary depending on the importance of taking some action, the costs of taking no action, the type of moving object, or based on other criteria.

In the exemplary method 400 of FIG. 4, if the confidence level is greater than the threshold level, then at step 470, the predicted control input, instructions or response is implemented. If the confidence level does not exceed the threshold level, then at step 480, a provisional control input, instruction or response is transmitted. At step 490, the actual response is received, and at step 495, a determination is made as to whether the actual response is the same as the predicted response. If yes, then at step 496, the control input, instruction or response is transmitted in an expedited manner. If no, then at step 497, the provisional control input, instruction or response is aborted, and the actual response is implemented.

Further elaborating on the drone example, consider a drone operator in Nevada controlling a drone flying over Iraq who is presented with data that is one second old. The operator may take one second to perceive, process, and react to the data, and the transmission of the response to the drone may take one second in transmission. In one aspect, the embodiments herein alter the data presented to the human operator in a way that shows the scene as it will exist at the time that the human response reaches the drone, allowing the most accurate and appropriate response by the human. In some aspects, when the human response is delayed more than the system anticipated, the response inputs may be altered to compensate for the movement of the objects being acted upon during that extra period of delay.

Consider a situation where the data presented to the operator is determined to be wrong, for example, if the target was predicted to be, and therefore is shown as being, in a position 50 meters north of its actual position three seconds after the time of measurement, but unexpectedly only travelled 30 meters in those three seconds. In that example, the control inputs sent by the remote operator may be negated, altered to take account of the different position, or otherwise modified or evaluated. In certain aspects, the effective range of the device (for example, the kill range of a piece of ordnance) may be utilized to determine whether and to what extent the control instructions should be altered or negated. In either event, the instant inventions make remote control and instruction more accurate than existing methods.

It should be noted that human control input may be utilized in conjunction with artificial intelligence or other programming of the remote device, so that even if the data presented to the human is less accurate than a desired threshold, the device may be able to compensate for the inaccuracy in the data presented to the human by modifying the human's instructions in a manner consistent with the error in the data presented to the human.

Returning to the left/right fork for example (see e.g., FIG. 2), imagine that there is only a single human operator, and the system detects that the target (e.g., target 201 of FIG. 2) is leaning slightly left when approaching the intersection of the left and right forks (e.g., forks 203 and 204 of FIG. 2). The predicted path is thus that the target goes left (takes left fork 203 of FIG. 2), and that is the visual image presented to the human operator. The human operator observes the scene and sends a control input to launch a missile (e.g., first missile 263 of FIG. 2) at the target. When the control input is received at the remote drone (e.g., first drone 261 of FIG. 2), the drone observes that the target actually took the right fork (e.g., right fork 204 of FIG. 2). The drone may, in one aspect, analyze the environment and other elements in the predicted left path and the actual right path and determine that the elements are more than X % similar, that there is an absence of Y type elements in both forks, and/or that it is more than N % confident that the human operator would have made the same decision had the prediction accurately shown the human operator that the target took the right path. If the confidence level exceeds a threshold, the drone may recalculate the human input for the left fork to deliver the same response to the target in the actual, right fork position.

In another aspect, where there are more possible predicted positions than the number of human operators, each operator may be shown a range of possible positions. Returning to the example of the left/right fork, imagine a single human operator. The operator may be shown the target simultaneously in both positions and, via appropriate input devices such as a touch-screen; the operator may indicate whether the left, right, or both positions should be fired upon.

Figure 5:
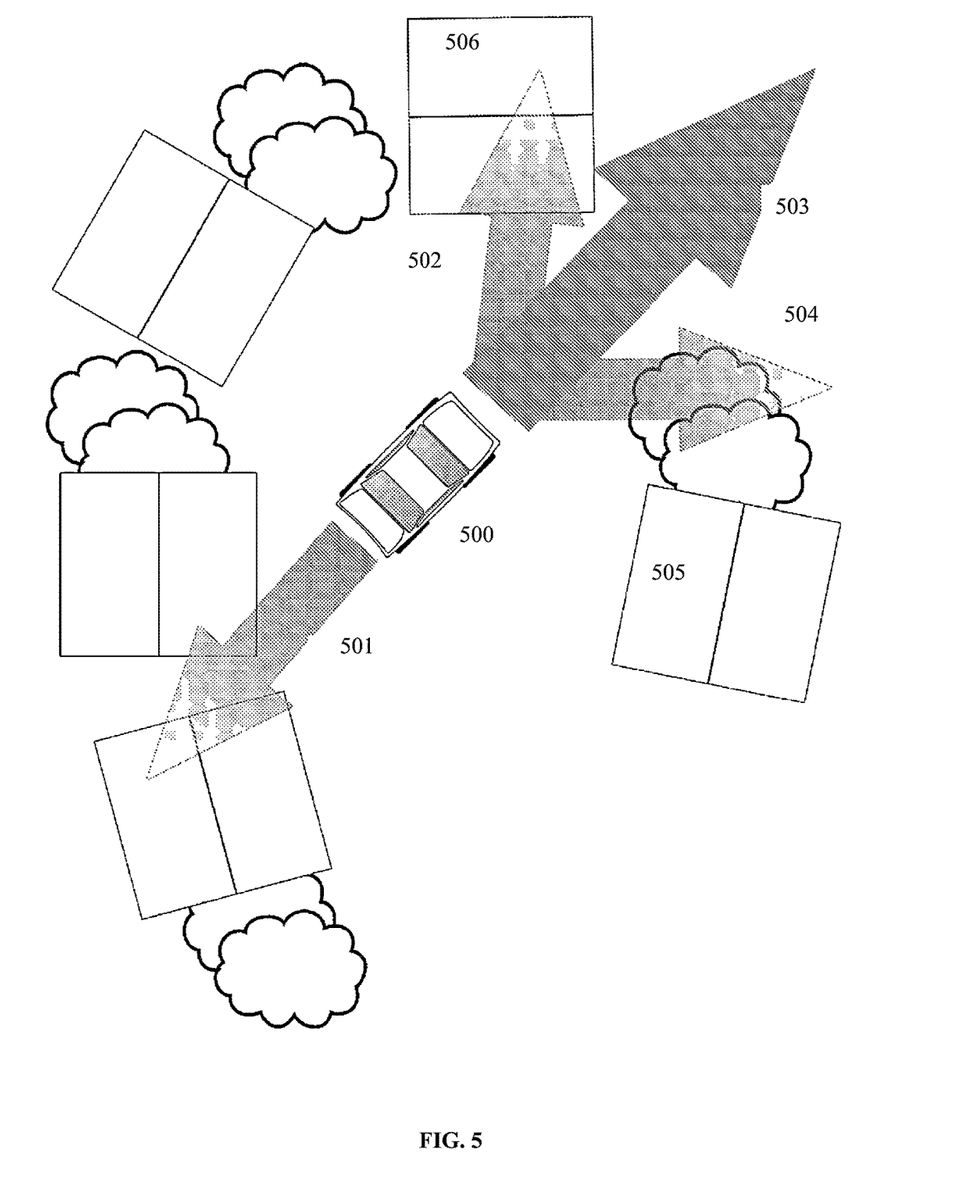
FIG. 5 schematically illustrates a method for control of remote objects based on a display of multiple predicted positions of an object.

Referring now to FIG. 5, some aspects of the present invention are schematically illustrated. FIG. 5 depicts a scene as it might be viewed by a drone flying overhead. The drone would transmit the scene to a human operator, await instructions from the operator, and implement the instructions when received. In FIG. 5, a car 500 containing a target (for example, a terrorist) may be observed moving at a certain rate of speed. As the video (which may, in one aspect, be a single frame, but in other aspects would be a stream of frames) is processed, the speed of the vehicle together with the paths determined to be most likely paths for the car to take, together with the most likely locations of the car, may be calculated. In FIG. 5, the car 500 may go into reverse, following a reverse path 501, may continue forward on a forward path 503, may turn left 502 toward a house 506, or may turn right 504, somewhat proximate to a house 505. While the forward path 503 is the most likely, the other paths 501, 502, 504 are also possible.

The operator may be presented with the single most likely location of the vehicle at the time his input is acted upon; however, it may be desirable to present the operator with a plurality of possible locations, in one aspect, those locations that exceed a threshold likelihood. Using the probabilities described above with regard to FIG. 5, the relative likelihood of various vehicle locations may be depicted in a manner that the human operator can perceive. FIG. 5 illustrates one method, namely, indicating likelihood of various positions by providing a darker (optionally colored) pathway. Another method illustrated by FIG. 5 is in providing arrows with increasingly large sizes indicating more probable pathways. Another method illustrated by FIG. 5 is that the indicated areas, such as the overlaid arrows 501, 502, 503, 504 may utilize a luminosity, a color and/or other gradient to indicate increasing or decreasing likelihood that the vehicle will be in that position at the target time.

In one aspect, the human operator may indicate which of the pathways should undergo which response, for example by touching, on a touch screen, pathways that should be fired upon with a missile. In FIG. 5, the operator may touch the two arrows 503, 504 that do not intersect with a house, indicating that when the instructions are received at the drone, if the vehicle has taken (or, in one aspect, if the vehicle later takes) one of the indicated pathways 503, 504, the vehicle should be fired upon, while the vehicle should not be fired upon if it does not take the indicated pathways.

The invention, while well illustrated in aspects by the example of a drone, is not so limited. Take for example a remote surgery application. Consider a surgical robot in Sudan being controlled by a pair of doctors in Boston. The surgical robot is cutting and a tiny bit of blood is detected. The computer system determines it is 50% likely to be a cut artery, 50% likely to be capillary blood or a similar artifact. One surgeon is shown a cut artery while another is shown nothing unusual. When the surgeons' inputs are received at the device, the data sent to the surgeons is compared to the then-current data and the surgeon who received the data that is most similar to the then-current data has their inputs utilized.

Similarly, if there is a single surgeon, the surgeon may be shown the cut artery, optionally together with a message indicating that it is a possibility of a cut artery or even the approximate risk that the cut artery has happened. The surgeon may make control inputs based on the cut artery scenario. If the artery is indeed cut, at the time the surgeon's control inputs arrive in Sudan, the device in Sudan determines the cut artery data is correct and that the control inputs were based on sufficiently accurate data and utilizes them. If the device determines that there was no cut artery, the control inputs are not utilized. In one aspect, a second surgeon or an artificial intelligence or programmatic control system may take action to maintain the status-quo during the time when the control inputs from Boston were based on an inaccurate prediction.

In another aspect, the image displayed to one or more surgeons (in the surgical example, or operators in other applications) shows a plurality of possible outcomes simultaneously. In one aspect, the opacity with which the outcomes are displayed is determined, at least in part, by the likelihood that the proposed action will result in the displayed outcomes. In another aspect, where the predicted position of an object includes more than one possible position, one or more of the possible positions may be simultaneously displayed. Optionally, the opacity of the object displayed in each of the possible positions may be modified to reflect the likelihood that the object will be in that position at the relevant time. In another aspect, where the predicted trajectory and/or pathway of object includes more than one likely trajectory or pathway, the opacity of the trajectory and/or pathway displayed may be modified to reflect the likelihood that the trajectory and/or pathway of the object is the actual trajectory or pathway.

Note that while this document refers to visual data, it should be appreciated that audio or other data may also be processed in the manner described herein. Further, while the document refers to human data processing, it should be appreciated that a non-human animal or even a computer may, in whole or in part, enjoy certain benefits of the instant invention.

What is claimed is:

1. A method for control of a remote device, the method comprising:
    analyzing by a computing device operably coupled to the remote device, a data stream to identify a speed and a trajectory of a moving object separate from the remove device, wherein the data stream is analyzed by using digital signal analysis and object recognition algorithms;
    determining by the computing device, at least one predicted path based, at least in part, on the trajectory and the speed of the moving object, wherein the at least one predicted path is selected from two or more possible paths and the two or more possible paths are based on physical characteristics of the object and an initial path on which the object is travelling;
    altering the data stream to display the moving object on the at least one predicted path;
    displaying the moving object on the at least one predicted path to at least one human operator;
    receiving control input from the at least one human operator;
    comparing the at least one predicted path to an actual path;
    determining the at least one predicted path matches the actual path;
    in response to determining that the at least one predicted path matches the actual path, controlling the remote device based on the control input by the at least one human operator.

2. The method of claim 1, further comprising calculating a probability that the moving object will be on the at least one predicted path.

3. The method of claim 1, further comprising, if the probability of two or more predicted paths is greater than a threshold probability, displaying the two or more predicted paths to a first human operator.

4. The method of claim 1, further comprising, if the probability of two or more predicted paths is greater than a threshold probability, displaying different predicted paths to different human operators.

5. The method of claim 4, wherein an opacity of the different predicted paths displayed relates to the likelihood that the object will be on a given predicted path.

6. The method of claim 1, further comprising, calculating an amount of time between generation of the data stream and perception of the data stream by the at least one human operator, and altering the amount of time to compensate for a flash-drag effect of the at least one human operator.

7. The method of claim 1, wherein the trajectory or the speed are determined based on an instantaneous trajectory, an instantaneous speed, a changing trajectory, a changing speed, or a combination thereof.

8. The method of claim 1, further comprising sending one or more control signals, instructions, or responses from the at least one human operator to the remote device when the actual path and one of the at least one predicted path are the same within a predetermined tolerance.

9. The method of claim 8, further comprising adjusting the at least one predicted path to compensate for a transmission time for the control signal, instruction, or response from the at least one human operator to be received by the remote device.

10. The method of claim 1, further comprising negating or altering a control signal, instruction, or response from the at least one human operator when the actual path and one of the at least one predicted path is less than a predetermined tolerance.

11. A system for compensating for the delay in controlling a remote device, the system comprising:
    a computing device operably coupled to the remote device, the computing device configured to:
    analyze, using digital signal analysis and object recognition algorithms, a data stream to identify a speed and a trajectory of a moving object separate from the remove device;
    determine a predicted path of the moving object based, at least in part on the trajectory and the speed of the moving object, wherein the predicted path is selected from two or more possible paths;
    alter the data stream to show the moving object on the predicted path;
    display the moving object on the predicted path to a human operator;
    receive control input from the human operator indicating a response;
    if an actual path is different from the predicted path, analyze elements in the predicted path and the actual path;
    if the elements are more than a threshold percentage similar, recalculate the control input from the human operator to deliver a same response to the actual path as the response of the human operator to the predicted path.

12. The system of claim 11, wherein the predicted path is adjusted to compensate for encryption and decryption times of the data stream.

13. The system of claim 11, wherein the predicted path is adjusted to compensate for processing time of the human operator and nerve signal to limb movement conversion time.

14. The system of claim 13, wherein the predicted path is further adjusted to compensate for a transmission time of the control input from the human operator to the remote device.

15. The system of claim 11, wherein the computing device is further configured to determine a predicted response of the human operator.

16. The system of claim 15, wherein the computing device is further configured to calculate a confidence level of the predicted response of the human, and when the confidence level is greater than a threshold level, instruct the remote device to implement the predicted response.

* * * * *